Patented Nov. 15, 1949

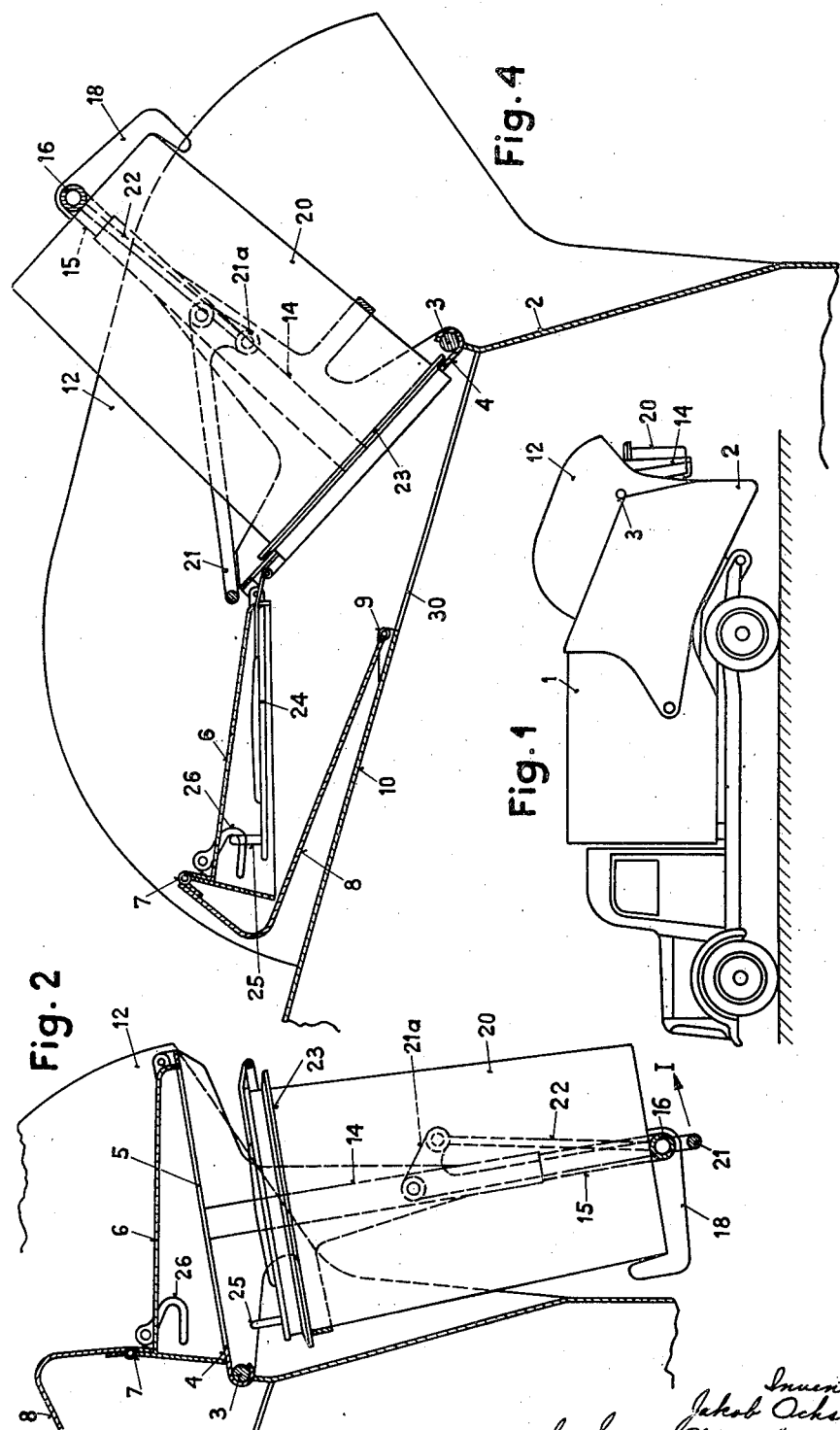

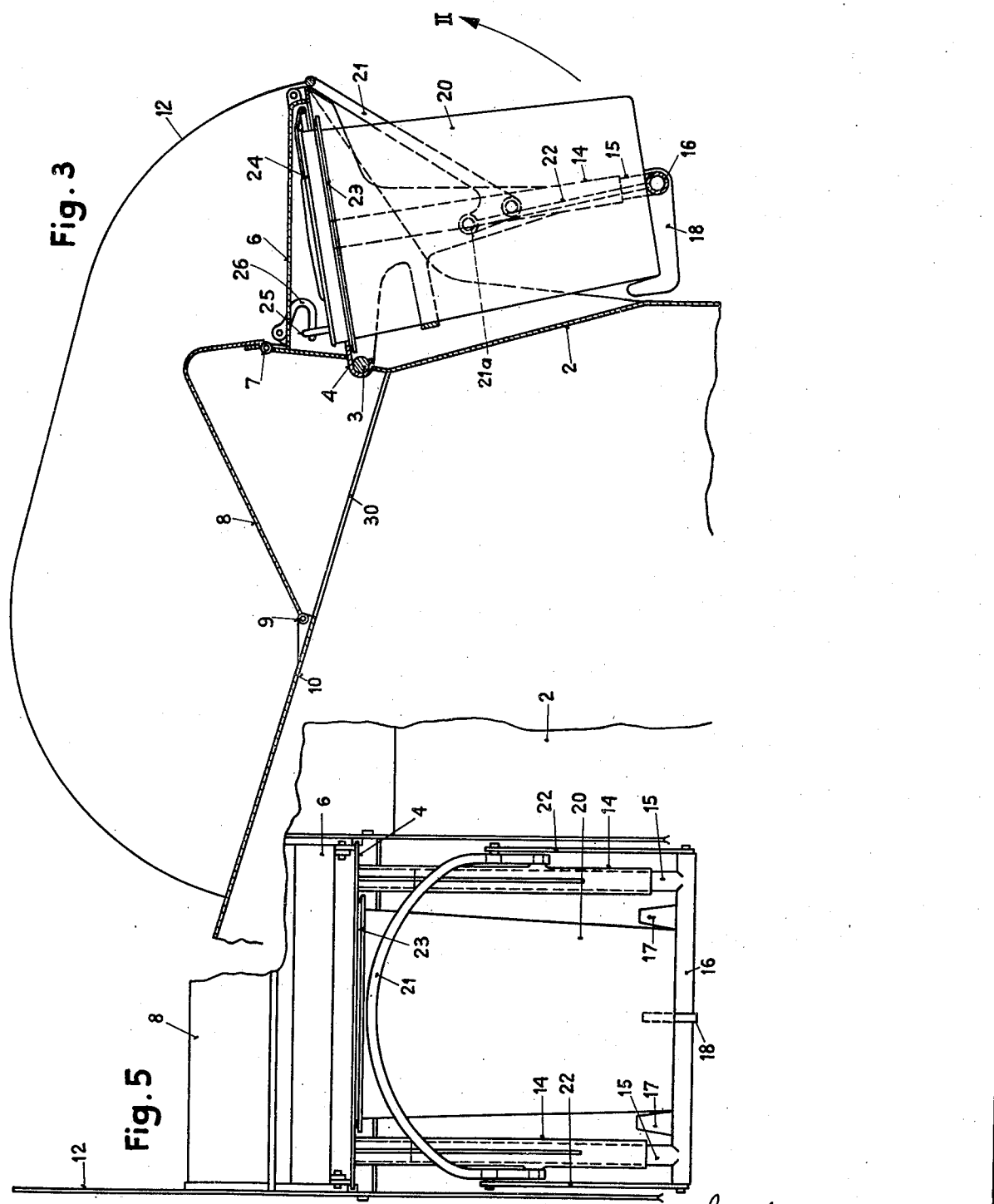

2,488,429

UNITED STATES PATENT OFFICE 2,488,429

DEVICE ON REFUSE COLLECTING VEHICLES FOR EMPTYING REFUSE PAILS

Jakob Ochsner, Zurich, Switzerland

Application September 19, 1947, Serial No. 775,012
In Switzerland May 15, 1946

3 Claims. (Cl. 214—67)

1

The subject of the present invention is a device on refuse collecting vehicles for emptying refuse pails with a rockable basket, adjustable in height, for the reception of the pail to be emptied and provided with a hinged lid. The invention has for its object to provide a device which allows of a practically completely dust-free emptying of the refuse pail into a refuse collecting vehicle, which operates practically noiselessly and which in addition can be produced simply and inexpensively.

A form of construction of the subject of the invention is shown in the accompanying drawings, wherein:

Fig. 1 shows a refuse collecting vehicle with the emptying device in side elevation.

Fig. 2 shows the emptying device in section in its lowermost position.

Fig. 3 shows the raised refuse pail in the position ready for emptying.

Fig. 4 shows the pail with the emptying device in the position allowing the emptying of the pail.

Fig. 5 is a view of the emptying device from the rear.

The refuse collecting vehicle 1 known per se is provided with a rear part 2, capable of being raised, on which is provided the emptying device for the pail. In the rear part 2 is mounted a turning shaft 3 to which is secured a plate 4 provided with an opening 5. On the plate 4 is rockably mounted a hood 6 which in turn carries a cover 8 by means of a hinge 7. The cover is rockably mounted by means of a hinge 9 on the upper side 10 of the part 2. On each side of the parts 4, 6, 8 is provided a protecting wall 12 which rises vertically from the part 2. To the plate 4 are secured two guides 14 in each of which a rod 15 is movably guided. The free lower ends of the rods 13 are connected together rigidly by a carrier 16. To the carrier are secured rigidly two stops 17 and an arm 18. The latter form a basket for the reception and for securing the pail 20 placed on the carrier 16. In guides 14 is mounted rockably a strap 21 which is connected hingedly by stays 22 to the carrier 16. The pail 20 is provided with a packing rim 23, which is larger than the opening 5 in the plate 4, further a cover 24 is hinged to the pail 21 in the known manner and is provided with an eye 25. The latter cooperates with a hook pivotally mounted on the hood 6.

The method of operation is as follows:

For emptying, the pail 20 is placed by the operator on the carrier 16 between the stops 17 and the arm 18 (Fig. 2). The strap 21 is rocked from its lower position in the direction of the arrow I until it arrives in the position in Fig. 3. By the

2 particular mounting of the carrier 16, which is connected pivotally by the stays 22 to the strap 21, the rods 15 and thus also the carrier 16 are raised to such an extent until the packing rim 23 of the pail comes to bear tightly against the plate 4. The arms 21a of the strap 21, connected to the stays 22, are thus swung slightly beyond their dead centre position and thus the basket has been secured against undesired lowering. The cover 24 is thus located in the hood 6 and the hook 26 has entered the eye 25. When the pail 20 is raised from the position in Fig. 3 in the direction of the arrow II it rocks about the shaft 3 and in its end position assumes the position in Fig. 4. The lid 24 has thus been raised by the hook 26 from its seat and rocked. During the above mentioned rocking of the pail also the hinged cover 8 and the hood 6 have been rocked. The upper opening of the pail 20 now lies exactly over the charging opening 30 of the rear part 2, that is to say the contents of the pail fall into the collecting vehicle. During the entire rocking of the pail the opening thereof which has been exposed by the hood 6 and the hinged cover 8 and the protecting wall 12 are so enclosed that practically no dust can pass outwardly and no draught air can penetrate inwardly. In practice it has been found that by this new construction an actually dust-free emptying of the pail is possible. The pail 20 can be swung upwardly by hand, it is, however, also possible to drive the shaft 3 positively and by a motor, for example by the vehicle engine, so that any manual work is omitted. The hook 26 must be so actuated that when raising the pail it enters the eye 25 and the completion of the emptying of the backwardly swung pail when lowering the latter again passes automatically out of the eye 25; this movement of the hook 26 is preferably controlled positively by the pail when raising and lowering the same. The new emptying device is in construction very simple, solid and allows as already mentioned, an entirely dust free emptying even of pails which for example contain clinker. In addition an operation which is extremely poor in noise is possible.

Having now particularly described and ascertained the nature of my said invention and in what manner the same is to be performed I declare that what I claim is:

1. In a refuse collecting vehicle provided in the upper side of its rear portion with a refuse charging opening and a plate having a refuse pail receiving aperture pivotally mounted about a horizontal axis at the rear edge of said refuse charging opening, a basket forming means attached to one side of said plate and adapted to receive a refuse pail having a hinged cover and an outwardly extending rim attached to said pail slightly spaced from the upper end of the same, said rim being provided for engaging the marginal portion of the aperture in said plate when the refuse pail is placed in said basket forming means, the cover of said pail being smaller than said aperture to freely pass therethrough, an adjustable carrier member forming the bottom of said basket forming means, manually operable means for adjusting said carrier member in a direction toward said apertured plate to clamp the rim of said pail tightly against the marginal portion of the aperture in said plate, and means for opening the cover of said pail when said plate with said basket forming means and said pail therein is pivoted upwardly about said horizontal axis to a position in which the pail is tilted to discharge its content into said refuse charging opening.

2. In a refuse collecting vehicle provided in the upper side of its rear portion with a refuse charging opening and a plate having a refuse pail receiving aperture pivotally mounted about a horizontal axis at the rear edge of said refuse charging opening, a cover for said refuse charging opening hingedly secured with one edge to said upper side at the front edge of said opening, a hood for covering said plate hingedly connected with one edge to the opposite edge of said cover and with the opposite edge to the free end of said apertured plate so as to overlie the aperture therein when the cover is arranged over said refuse charging opening, a basket forming means attached to one side of said plate and adapted to receive a refuse pail having a hinged cover and an outwardly extending rim attached to said pail slightly spaced from the upper end of the same, said rim being provided for engaging the marginal portion of the aperture in said plate when the refuse pail is placed in said basket forming means, the cover of said pail being smaller than said aperture to freely pass therethrough, an adjustable carrier member forming the bottom of said basket forming means, manually operable means for adjusting said carrier member in a direction toward said apertured plate to clamp the rim of said pail tightly against the marginal portion of the aperture in said plate, and means on said hood for opening the cover of said pail when said plate with said basket forming means and said pail therein is pivoted upwardly about said horizontal axis to a position in which the pail is tilted to discharge its content into said refuse charging opening, said last named pivotal movement of said pail to refuse discharging position causing said hood and said cover for the refuse charging opening to move to positions in which said hood is moved away from the plate and in which said refuse charging opening is uncovered respectively.

3. In a refuse collecting vehicle provided in the upper side of its rear portion with a refuse charging opening and a plate having a refuse pail receiving aperture pivotally mounted about a horizontal axis at the rear edge of said refuse charging opening, a basket forming means attached to one side of said plate and adapted to receive a refuse pail having a hinged cover and an outwardly extending rim attached to said pail slightly spaced from the upper end of the same, said rim being provided for engaging the marginal portion of the aperture in said plate when the refuse pail is placed in said basket forming means, the cover of said pail being smaller than said aperture to freely pass therethrough, a carrier member forming the bottom of said basket forming means and arranged for longitudinally adjustment lengthwise of said pail, manually operable lever means pivotally attached to a portion of said basket forming means which is fixed to said plate, linkage means connecting said lever means with said adjustable carrier member, whereby upon pivoting said lever means in one direction said carrier member causes said pail to be longitudinally adjusted in a direction toward said apertured plate to clamp the rim of said pail tightly against the marginal portion of the aperture in said plate, and means for opening the cover of said pail when said plate with said basket forming means and said pail therein is pivoted upwardly about said horizontal axis to a position in which the pail is tilted to discharge its content into said refuse charging opening.

JAKOB OCHSNER.

REFERENCES CITED

The following references are of record in the file of this patent:

UNITED STATES PATENTS

| Number | Name | Date |
|---|---|---|
| 1,963,288 | Ballert | June 19, 1934 |
| 2,417,696 | Linde | Mar. 18, 1947 |

FOREIGN PATENTS

| Number | Country | Date |
|---|---|---|
| 221,535 | Switzerland | Aug. 17, 1942 |
| 376,523 | Great Britian | July 14, 1932 |